| United States Patent [19] | [11] Patent Number: 4,914,183 |
| Geuze et al. | [45] Date of Patent: Apr. 3, 1990 |

[54] STEADY STATE PREPARATION OF HIGH BULK DENSITY POLYMER OF CARBON MONOXIDE AND OLEFINS

[75] Inventors: Maarten M. Geuze, Houston, Tex.; Gerrit G. Rosenbrand; James A. Salter, both of Amsterdam, Netherlands

[73] Assignee: Shell Oil Company, Houston, Tex.

[21] Appl. No.: 235,265

[22] Filed: Aug. 23, 1988

[30] Foreign Application Priority Data

Aug. 28, 1987 [NL] Netherlands .......................... 8702031

[51] Int. Cl.$^4$ .............................................. C08G 67/02
[52] U.S. Cl. .................................................... 528/392
[58] Field of Search ......................................... 528/392

[56] References Cited

U.S. PATENT DOCUMENTS

| 2,495,286 | 1/1950 | Brubaker | 260/63 |
| 3,694,412 | 9/1972 | Nozaki | 260/63 CQ |
| 4,778,876 | 10/1988 | Doyle et al. | 528/392 |

FOREIGN PATENT DOCUMENTS

| 121965 | 10/1984 | European Pat. Off. . |
| 181014 | 5/1986 | European Pat. Off. . |
| 222454 | 5/1987 | European Pat. Off. . |
| 248483 | 12/1987 | European Pat. Off. . |
| 257663 | 3/1988 | European Pat. Off. . |
| 301664 | 2/1989 | European Pat. Off. . |
| 1081304 | 8/1967 | United Kingdom . |

*Primary Examiner*—Harold D. Anderson
*Attorney, Agent, or Firm*—Dean F. Vance

[57] ABSTRACT

Linear alternating polymers of carbon monoxide and at least one ethylenically unsaturated hydrocarbon are produced in a continous flow reactor under conditions that result in a bulk density greater than 0.2 g/ml. The polymers are produced by polymerizing carbon monoxide and one or more olefinically unsaturated compounds in a continuous flow reactor in the presence of a palladium catalyst composition, the polymerization occuring in a liquid diluent in which the polymer product is almost or entirely insoluble, and by maintaining the polymerization at steady state wherein the ratio of the quantity of the polymer product formed per hour to the quantity of the polymer product in the reactor is less than 0.2.

12 Claims, No Drawings

STEADY STATE PREPARATION OF HIGH BULK DENSITY POLYMER OF CARBON MONOXIDE AND OLEFINS

FIELD OF THE INVENTION

The invention relates to the production of polymers of carbon monoxide and olefinically unsaturated compounds. More specifically, the invention relates to a polymerization process for making high bulk density polymers from the monomers.

BACKGROUND OF THE INVENTION

The class of polymers of carbon monoxide and olefin(s) has been known for a number of years. Early processes for the production of such polymers were typically free radical processes as illustrated by Brubaker, U.S. Pat. No. 2,495,286. The polymeric products of such processes were typically relatively low in carbon monoxide content.

More recently, processes for the production of polymers of carbon monoxide and ethylenically unsaturated hydrocarbon have been developed wherein the polymer product is a linear alternating polymer of carbon monoxide and ethylenically unsaturated hydrocarbon. Such processes typically employ a Group VIII transition metal compound or complex as catalyst. A recently developed process which is becoming of greater interest is described in published European Patent Applications 121,965 and 181,014. These processes employ a catalyst composition formed from a Group VIII metal salt wherein the metal is palladium, cobalt or nickel, the anion of certain strong acids and a bidentate ligand of phosphorus, arsenic or antimony. During the polymerization, the polymers are obtained in the form of a suspension in a diluent. The preparation of the polymers can, in principle, be carried out in either of two manners, viz. batchwise or continuously.

Batch preparation of the polymers is carried out by introducing the catalyst into a batch reactor containing the diluent and the monomers and which is at the desired temperature and pressure. As polymerization proceeds, the pressure drops, the concentration of the polymers in the diluent increases and the viscosity of the suspension rises. Polymerization is continued until the viscosity of the suspension rises. Polymerization is continued until the viscosity of the suspension has reached such a high value that continuing the process further would create difficulties in connection with heat removal. In principle, the only parameter which remains constant in batchwise polymer preparation is the temperature. A variant of batch polymerization is semi-batch preparation in which besides the temperature also the pressure is kept constant by adding monomers to the reactor during the polymerization.

In continuous polymer preparation, the diluent, the monomers and the catalyst are added to a reactor and a polymer suspension is continuously withdrawn from it. During the continuous polymer preparation, the temperature, the pressure and the liquid volume in the reactor are kept constant. After a starting-up period in which the polymer concentration in the suspension increases to the desired value, a stationary state is reached which is characterized by the suspension withdrawn from the reactor having a constant polymer content and the polymers contained therein having a constant bulk density.

For the preparation of the polymers on an industrial scale, a continuous process is greatly to be preferred to batchwise or semi-batchwise production for the following reasons. In the first place, the continuous process gives a higher polymer output because production does not, as in batch preparation, have to be frequently interrupted for charging and discharging the reactor. Since continuous operation, in contrast with batch production, is characterized by all the reaction parameters remaining constant, a continuous process is easier to regulate and is more suitable for automation. Finally, the continuous process produces polymers which exhibit less variation in properties and therefore have a more constant quality than those obtained from batch production.

Linear alternating polymers of carbon monoxide and olefinically unsaturated compounds have previously been made by batch processes which typically produce polymers having bulk densities less than 3 g/ml. Bulk density plays an important role, both in the preparation and also in the refining, storage, transport and processing of the polymers.

As regards the preparation of the polymers, it can be stated in approximate terms that the maximum permissible suspension concentration, expressed in kg polymer/kg suspension, is about one hundred times the bulk density expressed in g/ml. This means that when preparing a polymer with a bulk density of 0.1 g/ml, the maximum suspension concentration will be about 10% and when preparing a polymer with a bulk density of 0.5 g/ml the maximum suspension concentration will be about 50%. Thus, increasing the bulk density by a factor of five enables about five times as much polymer to be prepared in the same reaction volume.

As regards the purification of the polymers, such as filtering, washing and drying, the quantity of attached liquid is determined to a large extent by the bulk density of the polymers. It has been found, for example, that a polymer with a bulk density of 0.1 g/ml binds about 5 g diluent or washing liquid per gram, while the corresponding quantity for a polymer with a bulk density of 0.5 g/ml is only 0.25 g. This is naturally very important in connection with the quantity of liquid needed for washing the polymers and that subsequently has to be removed when drying the polymers.

As regards transport and storage, the polymers exhibit a more attractive flow behavior and occupy less space the higher their bulk density.

As regards processing, polymers with a low bulk density must often first be compressed, for example by extrusion, in order to make them suitable for further processing in the customary apparatus. The extrusion of polymers always changes the polymer to some extent by inducing crosslinking, chain scission, or further polymerization. The higher the bulk density of the polymers, the less need there is for a pretreatment of the material, which is thus suitable for further processing.

SUMMARY OF THE INVENTION

This invention contemplates the production of linear alternating polymers of carbon monoxide and at least one ethylenically unsaturated hydrocarbon in a continuous polymerization reactor under conditions that produce the polymer at a bulk density greater than 0.2 g/ml. In particular, it has been found that for the preparation of the present polymers with a bulk density greater than 0.2 g/ml by a continuous process, care must be taken to ensure that the ratio of the quantity of polymer formed per hour to the quantity of polymer in the reactor is less than 0.2.

The present invention therefore includes a process for the preparation of polymers in which carbon monoxide and one or more olefinically unsaturated compounds are polymerized in a continuous flow reactor containing a palladium-containing catalyst composition in a diluent in which the polymers are almost or entirely insoluble, wherein, after reaching a stationary state, the ratio of the quantity of polymer formed per hour to the quantity of polymer in the reactor is less than 0.2.

The invention includes linear alternating polymers of carbon monoxide and olefinically unsaturated compounds as new materials, in as far as they have a bulk density greater than 0.3 g/ml prior to any extrusion of the polymer

DESCRIPTION OF THE INVENTION

The process of the invention serves to produce linear alternating copolymers of carbon monoxide and at least one olefinically unsaturated compound, the copolymers having high bulk densities. Such linear alternating polymers are often referred to as polyketones or polyketone polymers. They are represented by the repeating formula -CO-(A)- wherein A is a moiety of an olefinically unsaturated compound polymerized through the olefinic unsaturation. By way of further illustration, when the unsaturated compound is ethylene, the polymer is represented by the repeating formula

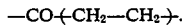

—CO(-CH$_2$—CH$_2$-)-.

Suitable olefinically unsaturated compounds for use as precursors of the polyketones have up to 20 carbon atoms inclusive, preferably up to 10 carbon atoms inclusive, and are aliphatic such as ethylene and other alpha-olefins including propylene, 1-butene, isobutylene, 1-hexene and 1-dodecane, or are arylaliphatic containing an aryl substituent on a carbon atom of an otherwise aliphatic molecule, particularly an aryl substituent on a carbon atom of the olefinic unsaturation. Illustrative of this latter class of olefinically unsaturated compounds are styrene, p-methylstyrene, p-ethylstyrene and m-methylstyrene. Preferred polyketone polymers are copolymers of carbon monoxide and ethylene or terpolymers of carbon monoxide, ethylene and a second olefinically unsaturated compound of at least 3 carbon atoms, particularly an alpha-olefin such as propylene.

When terpolymers of carbon monoxide, ethylene and a second olefinically unsaturated compound are produced, there will be at least two units incorporating a moiety of ethylene for each unit incorporating a moiety of the second compound, preferably from about 10 to about 100 units incorporating a moiety of ethylene for each unit incorporating a moiety of the second compound. The polymer chain is therefore represented by the following repeating formula

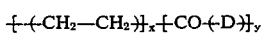

-(-(-CH$_2$—CH$_2$-)-$_x$-(-CO-(-D-)-)-$_y$ wherein D is the moiety obtained by polymerization of the second unsaturated compound through the olefinic unsaturation. The —CO CH$_2$—CH$_2$) units and the —CO-(-D-)- units are formed randomly throughout the polymer chain and the ratio of y:x is no more than about 0.5. In the modification where copolymers of carbon monoxide and ethylene are produced, there will be no second hydrocarbon present in the polymer chain and the polymers are represented by the above formula wherein y = 0. When y is other than 0, i.e., terpolymers are produced, the ratio of y:x is preferably from about 0.01 to about 0.1.

High molecular weight linear alternating polyketones can be prepared by using catalyst compositions based upon (a) a palladium compound,
(b) an anion of an acid with a pKa of less than 6, and
(c) a diphosphine of the general formula

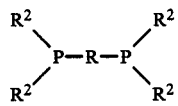

wherein each R$^2$ is independently a similar or different carbocyclic hydrocarbon group which may optionally be substituted with polar groups, and wherein R represents a bivalent bridging group containing at least two carbon atoms in the bridge.

The palladium compound used in the catalyst compositions as component (a) is preferably a palladium salt of a carboxylic acid and in particular palladium acetate. The preferred component (b) in the catalyst compositions is an anion of an acid with a pKa of less than 4 (determined in aqueous solution at 18° C.) and in particular an anion of an acid with a pKa of less than 2. More specifically, preference is given to an anion of a sulphonic acid, such as para-toluenesulphonic acid or to an anion of a carboxylic acid, such as trifluoroacetic acid. In the catalyst compositions, component (b) is preferably present in a quantity of from 0.5 to 200 and in particular of from 1.0 to 100 equivalents per gram atom of palladium. Component (b) may be taken up in the catalyst compositions in the form of an acid and/or in the form of a salt. Eligible salts include non-noble transition metal salts and in particular copper salts. If desired, components (a) and (b) may be used combined in a single compound. An example of such a compound is the complex Pd(CH$_3$CN)$_2$(O$_3$S—C$_6$H$_4$—CH$_3$)$_2$ which can be prepared by the reaction in acetonitrile of either palladium chloride with silver para-tosylate, or palladium acetate with para-toluenesulphonic acid.

In the catalyst compositions, component (c) is preferably present in a quantity of 0.1–2 and in particular of 0.75–1.5 mol per mol of palladium compound.

In the diphosphines used as components (c), the groups R$^2$ are preferably aryl groups optionally substituted by polar groups, and in particular phenyl groups optionally substituted by polar groups. Preferably, at least one of the groups R$^2$ contain at least one polar substituent. As polar substituents that may be present in the carbocyclic hydrocarbon groups may be mentioned, inter alia, dialkylamino groups, such as dimethylamino groups, and alkoxy groups, such as methoxy and tertiary butoxy groups. Particular preference is given to components (c) in which the groups R$^2$ are all the same. If one or more of the groups R$^2$ are aryl groups containing one or more polar substituents, then at least one of these polar substituents will preferably be in the ortho position relative to the phosphorus atoms to which the aryl group is linked. Examples of polar-substituted carbocyclic hydrocarbon groups which may be present in the diphosphines are the 2-methoxyphenyl group and the 2,4-dimethoxyphenyl group. Preference is given to components (c) in which all R$^2$ groups are 2-methoxyphenyl groups.

In the diphosphines used in the catalyst compositions as components (c), R represents a bivalent bridging group containing at least two carbon atoms in the bridge. Preferably, bridging group R contains three atoms in the bridge with at least two of which are carbon atoms. Examples of suitable bridging groups R are the —$CH_2$—$CH_2$—$CH_2$— group, the —$CH_2$—$C(CH_3)_2$ group, the —$CH_2$—$Si(CH_3)_2$—$CH_2$— group, and the —$CH_2$—$C(R^3)(R^4)$—$CH_2$— group in which $R^3$ represents a methyl group and $R^4$ a diphenylphosphinomethyl group.

In order to enhance the activities of the present catalyst compositions, it is preferred to incorporate a 1,4-quinone as a component (d). In addition to optionally alkyl-substituted 1,4-benzoquinones, there are other eligible 1,4-quinones, such as optionally alkyl-substituted 1,4-naphthoquinones. It is preferred to use 1,4-benzoquinone and 1,4-naphthoquinone as promoters. The quantity of 1,4-quinone used preferably amounts to 10-1000 mol and in particular 25-250 mol per gram atom of palladium.

The polymerization by using the catalyst compositions according to the invention is preferably carried out by contacting the monomers with a solution of the catalyst composition in a diluent in which the polymers are not or virtually not soluble. As diluents, either single diluents or compound diluents may be used. Examples of single diluents are lower aliphatic alcohols such as methanol and ethanol. Examples of compound diluents are mixtures of lower aliphatic alcohols and lower aliphatic ketones such as mixtures of methanol with acetone or with methyl ethyl ketone. In the present polymerization, preferably a lower aliphatic alcohol and in particular methanol is used as the diluent. As a rule the same liquid is used as solvent for the palladium-containing catalyst composition as is used for the polymerization.

The quantity of catalyst composition used in the preparation of the polymers may vary within wide ranges. Per mol of olefinically unsaturated compound to be polymerized, such a quantity of catalyst is preferably used as to contain $10^{-7}$–$10^{-3}$, and in particular $10^{-6}$–$10^{-4}$, gram atom of palladium.

The preparation of the polymers is preferably carried out at a temperature of 20°–200° C. and a pressure of 1–200 bar and in particular at a temperature of 30°–150° C. and a pressure of 20–100 bar. In the mixture to be polymerized, the molar ratio of the olefinically unsaturated compounds relative to carbon monoxide is preferably 10:1–1:5 and in particular 5:1–1:2.

In the process according to the invention, care should be taken to ensure that the ratio of the quantity of polymer formed per hour to the quantity of polymer in the reactor is less than 0.2. The lower this ratio, the higher is the bulk density of the polymers obtained. Preferably, the process is carried out such that the ratio is less than 0.15 and in particular less than 0.1. This ratio can be reduced by reducing the quantity of polymer formed per hour or by increasing the quantity of polymer in the reactor. The quantity of polymer formed per hour can be reduced, for example, by employing less catalyst, by employing a less active catalyst, by reducing the temperature, or by reducing the pressure. The quantity of polymer in the reactor can be raised by prolonging the residence time of the polymer in the reactor.

The invention is now illustrated with the aid of the following examples.

EXAMPLE 1

A carbon monoxide/ethylene copolymer was prepared as follows. The following components were added to a 150 liter reactor: methanol, carbon monoxide, ethylene and a catalyst solution in methanol. The total gas feed velocity (carbon monoxide +ethylene) to the reactor at standard conditions of 0° C. and 1 atmosphere was 700 liter/hour. The gas contained 43 vol% ethylene and 57 vol.% carbon monoxide. The catalyst solution had the following composition: 1 liter of methanol which contained 0.0075 mol palladium acetate (corresponding to 0.8 mg palladium/ml), 0.15 mol trifluoroacetic acid, and 0.0091 mol 1,3-bis(diphenylphosphino)propane. The pressure in the reactor was 45 bar. This pressure was maintained by removing the excess of feed gases from the reactor. The temperature in the reactor was 45° C. The quantity of methanol in the reactor was 70 kg which was kept constant by removing the excess suspension from the reactor and adding methanol. After the starting-up period the following process conditions had been reached: the catalyst concentration was 3.7 mg palladium/liter methanol. The polymer concentration was 105 g/kg methanol. The bulk density of the polymer was 0.54 g/ml. In order to keep the polymer concentration and the catalyst concentration constant, 3 kg methanol and 14 ml catalyst solution (corresponding to 11.2 mg palladium) had to be added to the reactor per hour. Both the polymer content of the suspension withdrawn from the reactor and the bulk density of the polymers present therein were constant, which indicated that a steady state had been reached.

The quantity of polymer formed per hour was 315 g and the polymerization rate was 1200 g polymer/g palladium/hour.

EXAMPLE 2

A carbon monoxide/ethylene/propylene terpolymer was prepared in a virtually analogous manner to the copolymer in example 1, but with the following differences:

(a) propylene was additionally added to the reactor, (b) the total gas feed velocity (carbon monoxide +ethylene) at standard conditions of 0° C. and 1 atmosphere was 295 liters/hour, (c) the catalyst concentration was 4.8 mg palladium/liter methanol, (d) the polymer concentration was 106 g polymer/kg methanol, (e) the bulk density of the polymer was 0.53 g/ml, and (f) in order to keep the polymer concentration and catalyst concentration constant, 1.5 kg methanol, 9 ml catalyst solution (corresponding to 7.2 mg palladium) and 196 g propylene had to be added to the reactor per hour.

The quantity of polymer formed per hour was 159 g and the polymerization rate was 320 g polymer/g palladium/hour.

EXAMPLE 3 (Comparative)

A carbon monoxide/ethylene copolymer was prepared in a virtually analogous manner to the copolymer in example 1, but with the following differences:

(a) the total gas feed velocity (carbon monoxide +ethylene) at standard conditions of 0° C. and 1 atmosphere was 2000 liters/hour, (b) the temperature was 65° C., (c) the catalyst concentration was 20 mg palladium/liter methanol, (d) the polymer concentration was 85 g polymer/kg methanol, (e) The bulk density of the polymer was 0.18 g/ml, and (f) in order to keep the polymer concentration and catalyst concentration constant, 18 kg methanol and 450 ml catalyst solution (corresponding to 360 mg palladium) had to be added to the reactor per hour.

The quantity of polymer formed per hour was 1540 g and the polymerization rate was 1100 g polymer/g palladium/hour.

EXAMPLE 4

A carbon monoxide/ethylene/propylene terpolymer was prepared in a virtually analogous manner to the copolymer in example 1, but with the following differences:

(a) propylene was additionally added to the reactor, (b) the total gas feed velocity (carbon monoxide +ethylene) at standard conditions of 0° C. and 1 atmosphere was 610 liters/hour, (c) the catalyst solution had the following composition: a mixture of 750 ml methanol and 250 ml toluene contained 0.0045 mol palladium acetate (corresponding to 0.48 mg palladium/ml), 0.09 mol trifluoroacetic acid, and 0.0054 mol 1,3-bis)di-2-methoxyphenylphosphino)-propane, (d) the temperature was 77° C., (e) the catalyst concentration was 2.8 mg palladium/kg methanol, (f) the polymer concentration was 280 g/kg methanol, (g) the bulk density of the polymer was 0.55 g/ml, and (h) in order to keep the polymer concentration and catalyst concentration constant, 2.1 kg methanol, 0.28 kg propylene and 12 ml catalyst solution (corresponding to 11.2 mg palladium) had to be added to the reactor per hour.

The quantity of polymer formed per hour was 588 g and the polymerization rate was 3000 g polymer/g palladium/hour.

EXAMPLE 5 (Comparative)

A carbon monoxide/ethylene/propylene terpolymer was prepared in a virtually analogous manner to the copolymer in example 1, but with the following differences:

(a) propylene was additionally added to the reactor, (b) the total gas feed velocity (carbon monoxide +ethylene) at standard conditions of 0° C. and 1 atmosphere was 2000 liters/hour, (c) the catalyst solution had the same composition as that used in example 4, (d) the temperature was 85° C., (e) the catalyst concentration was 2.5 mg palladium/kg methanol, (f) the polymer concentration was 85 g/kg methanol, (g) the bulk density of the polymer was 0.16 g/ml, and (h) in order to keep the polymer concentration and catalyst concentration constant, 17 kg methanol, 2.27 kg propylene and 177 ml catalyst solution (corresponding to 85 mg palladium) had to be added to the reactor per hour.

The quantity of polymer formed per hour was 1680 g and the polymerization rate was 4800 g polymer/g palladium/hour.

Of Examples 1-5, Examples 1, 2 and 4 are in accordance with the invention. Example 1 relates to the preparation of a carbon monoxide/ethylene copolymer with a bulk density of 0.54 g/ml, which preparation was carried out as a continuous process such that the ratio of the quantity of polymer formed per hour to the quantity of polymer in the reactor was 0.04. Examples 2 and 4 relate to preparations of carbon monoxide/ethylene/propylene terpolymers with bulk densities of 0.53 and 0.55 g/ml, which preparations were carried out as a continuous process such that the ratio of the quantity of polymer formed per hour to the quantity of polymer in the reactor was 0.02 and 0.03, respectively. Examples 3 and 5 fall outside the scope of the invention. They are included in the patent application for purposes of comparison. These comparative examples relate to the preparation of a carbon monoxide/ethylene copolymer with a bulk density of 0.18 g/ml and the preparation of a carbon monoxide/ethylene/ propylene terpolymer with a bulk density of 0.16 g/ml. Although the polymerizations in Examples 3 and 5 were carried out in a continuous manner, the ratio of the quantity of polymer formed per hour to the quantity of polymer in the reactor was 0.26 and 0.28, respectively.

What is claimed is:

1. A process for preparing high bulk density polymers from carbon monoxide and at least one olefinically unsaturated compound, comprising the steps of:

polymerizing carbon monoxide and one or more olefinically unsaturated compounds in a continuous flow reactor in the presence of a palladium catalyst composition, the polymerization occuring in a liquid diluent in which the polymer product is almost or entirely insoluble; and maintaining the polymerization at a steady state wherein the ratio of the quantity of the polymer product formed per hour to the quantity of the polymer product in the reactor is less than 0.2.

2. The process of claim 1, wherein the ratio of the quantity of the polymer product formed per hour to the quantity of the polymer product in the reactor is less than 0.15.

3. The process of claim 1, wherein the ratio of the quantity of the polymer product formed per hour to the quantity of the polymer product in the reactor is less than 0.10.

4. The process of claim 1, wherein the olefinically unsaturated compound is predominantly ethylene and the polymerization is carried out at a temperature of 30°-150° C., a pressure of 20-100 bar and, in the mixture to be polymerized, a molar ratio of the olefinically unsaturated compounds relative to carbon monoxide of 5:1-1:2, and in that the catalyst composition contains $10^{-6}$-$10^{-4}$ gram atom of palladium per mole of olefinically unsaturated compound.

5. The process of claim 4, wherein a small amount of propylene is polymerized with the ethylene and the carbon monoxide.

6. The process of claim 1, wherein the palladium catalyst composition comprises:

(a) a palladium compound, (b) an anion of an acid with a pKa of less than 6, and (c) a diphosphine ligand of the general formula

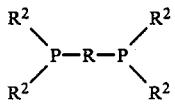

wherein each R² is independently a similar or different carbocyclic hydrocarbon group unsubstituted or substituted with polar groups, and wherein R represents a bivalent bridging group containing at least two carbon atoms in the bridge.

7. The process of claim 6, wherein the palladium compound of component (a) is a palladium salt of a carboxylic acid and the acid in component (b) has a pKa less than 2.

8. The process of claim 6, wherein each carbocyclic hydrocarbon group in the diphosphine ligand is substituted with polar groups.

9. The process of claim 8, wherein the polar groups are phenyl groups, 2-methoxyphenyl groups, or 2,4-dimethoxyphenyl groups.

10. The process of claim 8, wherein at least one of the polar groups is attached to the carbocyclic hydrocarbon group in an ortho position relative to attachment to the carbocyclic group to phosphorus.

11. The process of claim 6, wherein the catalyst composition further comprises a 1,4-quinone as component (d).

12. The process of claim 11, wherein the 1,4-quinone added as component (d) is 1,4-benzoquinone or 1,4-napthquinone in an amount of from about 25 to about 250 moles per gram atom of palladium.

* * * * *